N. A. GREGORY.
GARDEN OR FIELD TOOL.
APPLICATION FILED SEPT. 8, 1915.
1,283,739.
Patented Nov. 5, 1918.
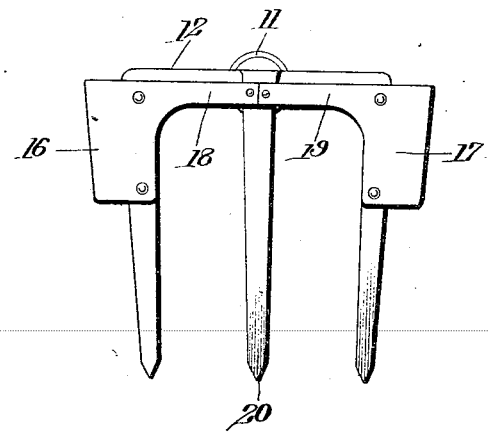

UNITED STATES PATENT OFFICE.

NATHANIEL A. GREGORY, OF CHASE CITY, VIRGINIA.

GARDEN OR FIELD TOOL.

1,283,739. Specification of Letters Patent. Patented Nov. 5, 1918.

Application filed September 8, 1915. Serial No. 49,597.

*To all whom it may concern:*

Be it known that I, NATHANIEL A. GREGORY, a citizen of the United States, and resident of Chase City, in the county of Mecklenburg, State of Virginia, have invented certain new and useful Improvements in Garden or Field Tools, of which the following is a specification.

This invention relates to an implement or tool to be operated by hand for cultivating plants in the field or garden. It is intended for use in digging or breaking up the ground and also for the purpose of raking or smoothing the ground. In addition to the above purposes the device includes means for hoeing or cutting when desired or necessary. The device embodies in a very simple construction means for performing all three of the functions above indicated. The novel features of the invention will be apparent from the following description taken in connection with the drawing.

The drawing shows a front elevation of a device embodying my invention.

As shown in the drawing, my device embodies a handle 11 which is of the usual type used for hoes and rakes. To the end of the handle is attached the frame 12 having a plurality of downwardly projecting prongs, these prongs being preferably slightly curved in side elevation. These prongs are thereby adapted to dig into the ground turning up the soil and they can then be used for raking over the surface of the soil to remove the loosened grass or other articles and to break down the lumps of earth. It will of course be understood that the invention is not limited to the use of any particular number of prongs although I have shown in the drawing a device embodying three prongs simply for the purpose of illustration.

Along the upper outer edge of the outer prongs I place a cutting blade or hoe which preferably extends downwardly along the side of the prong for about two-fifths of the length of the prong. Instead of placing the cutting blade on one side of the implement only, I may place such a blade on each of the outer prongs. It will be understood that in operating the device for digging or raking the workman may sometimes wish to make use of a cutting implement like a hoe to remove a bunch of grass or to do similar work and with the device shown it is merely necessary for him to turn the implement over on its side using the cutting blade in the same way that a hoe is used.

I preferably make the cutting blades as separate parts detachably secured in place as shown in the drawing, where the parts 16 and 17 are secured on the outer face of the outer prongs. In this instance a part of the plate 18 and 19 may extend laterally to and across the adjacent prong and may be secured to that prong so as to hold the cutting blades more securely in position. In this instance I have shown a central prong 20, making three prongs in all, and the extension from the blades 16 and 17 is secured to this prong.

Having thus described the invention, what is claimed and desired to be secured by Letters Patent is:

An implement of the class described comprising a frame, a handle therefor, two pointed curved digging prongs projecting downwardly at the margins of said frame, and a thin member of sheet metal extending across and secured in place on the outer face of said frame and of said prongs extending beyond the side margins of the prongs forming a cutting edge the said edge extending part way down said prongs from the top.

In testimony whereof I affix my signature.

NATHANIEL A. GREGORY.

Copies of this patent may be obtained for five cents each, by addressing the "Commissioner of Patents, Washington, D. C."